INVENTOR
CHARLES H. JONES
BY
ATTORNEYS (11.9 KC) 200 YARDS (13.33 KC) 1640 YARDS (13.7 KC) 2000 YARDS (20.7 KC) 6000 YARDS (17.65 KC) 4640 YARDS

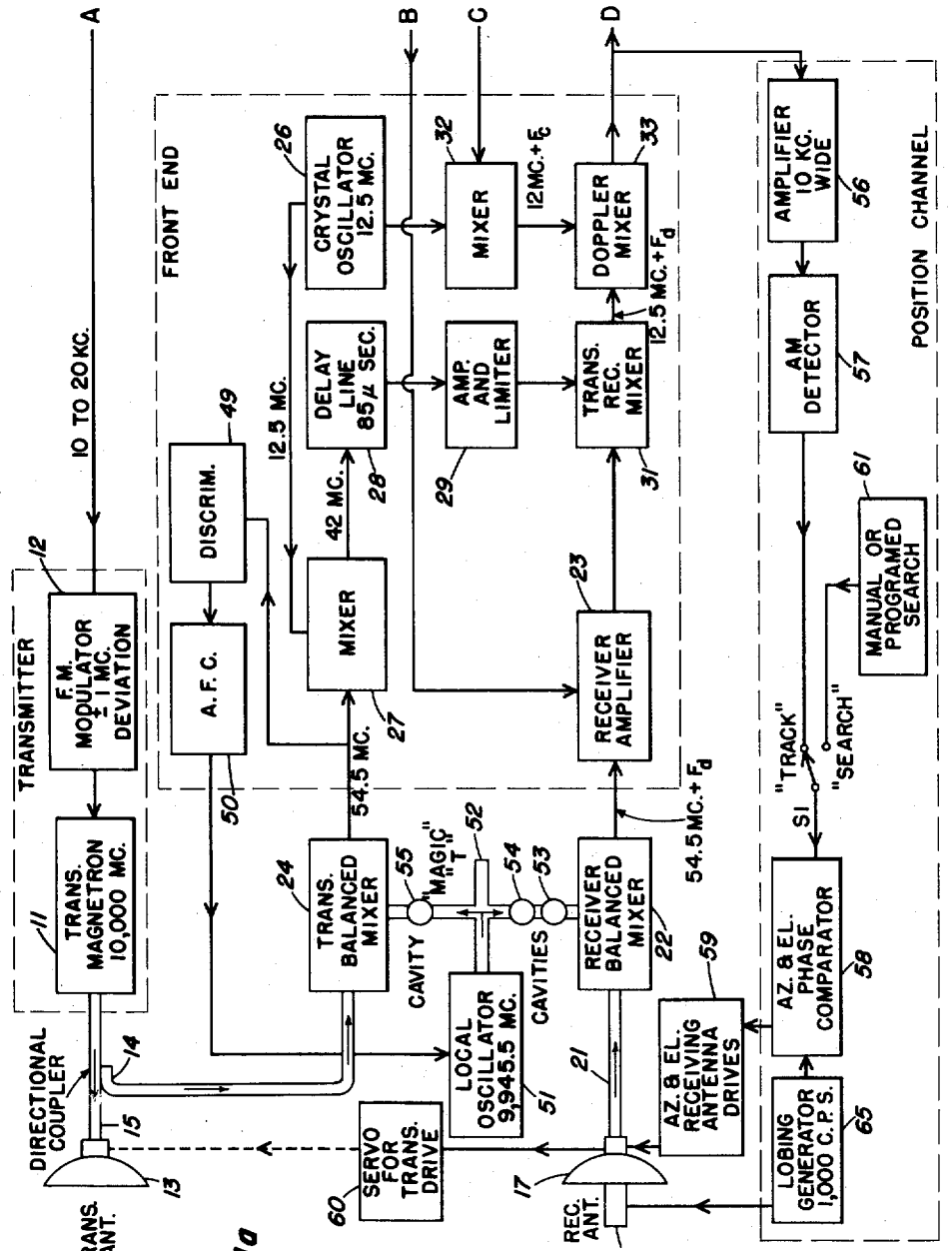

Sept. 13, 1960 C. H. JONES 2,952,809
ANTI-LEAKTHROUGH PHASE COMPARATOR
Filed Feb. 29, 1956 5 Sheets-Sheet 5

INVENTOR
CHARLES H. JONES
BY
ATTORNEYS

United States Patent Office 2,952,809
Patented Sept. 13, 1960

2,952,809

ANTI-LEAKTHROUGH PHASE COMPARATOR

Charles Howard Jones, Pittsburgh, Pa., assignor, by mesne assignments, to the United States of America as represented by the Secretary of the Navy Filed Feb. 29, 1956, Ser. No. 568,678

4 Claims. (Cl. 324—87)

The present invention relates to an anti-leakthrough phase comparator and more particularly to an anti-leakthrough phase comparator having utility in FM radar systems.

In FM radar systems, range errors are introduced by a portion of the transmitted signal which gets into the receiver channel. This signal is referred to as "leakthrough." If its amplitude is large, it may prevent the equipment in the radar system from locking up in range, velocity or position; however, even if its amplitude is small, it can cause errors in range. The present invention relates to a phase comparator utilizable in the range channel of FM radar systems and which gives no output except during the peaks of the error signal that is employed to control the rate of modulation. At ranges from 200 yards to 3000 yards, the amplitude of the output from the range channel discriminator produced by leakthrough is substantially zero during the peaks of the error signal, so such a comparator will discriminate against leakthrough.

Accordingly, an object of the present invention is a phase comparator that will discriminate against leakthrough in an FM radar system.

Another object is to provide a phase comparator for use in the range channel of an FM radar system which gives no output except during the peaks of the error signal.

A further object of the invention is the provision of a phase comparator for reducing range errors in FM radar systems that are the result of leakthrough.

Figure 1B:
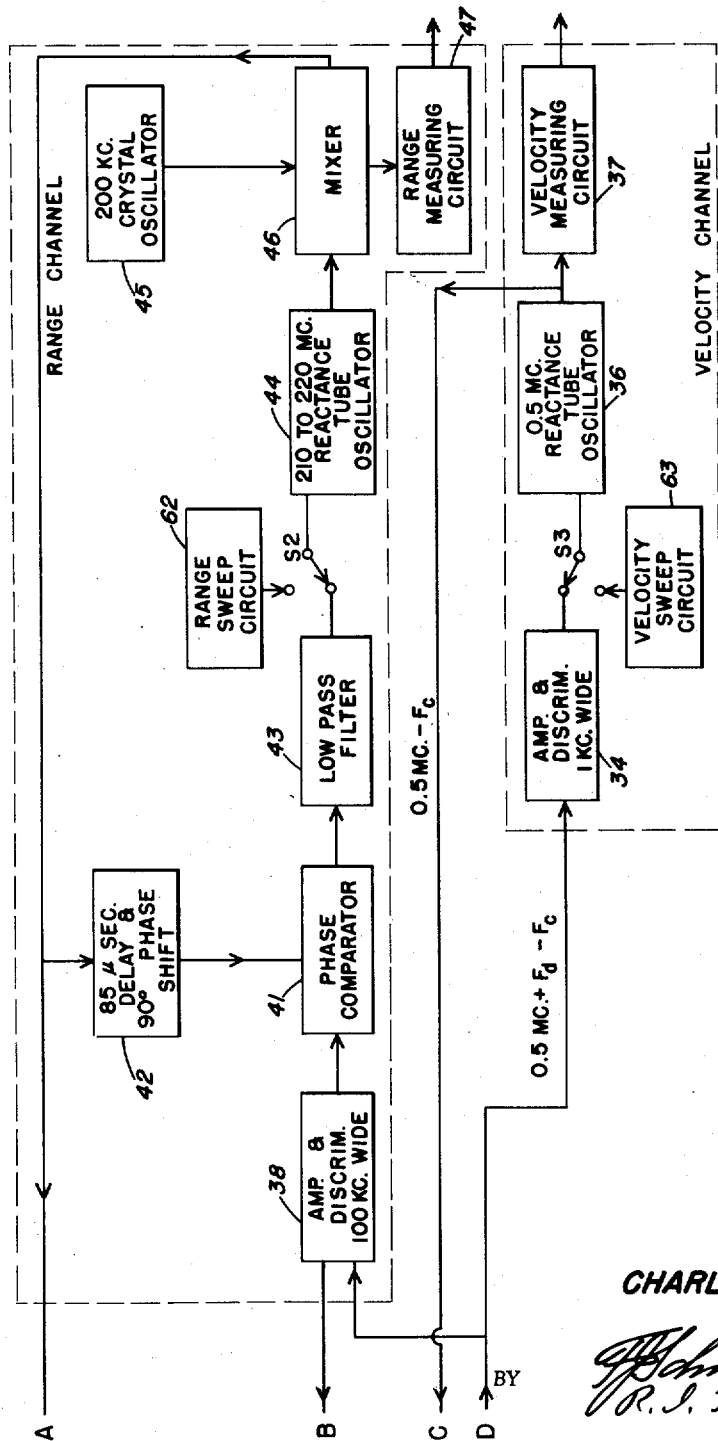
Figure 2A:
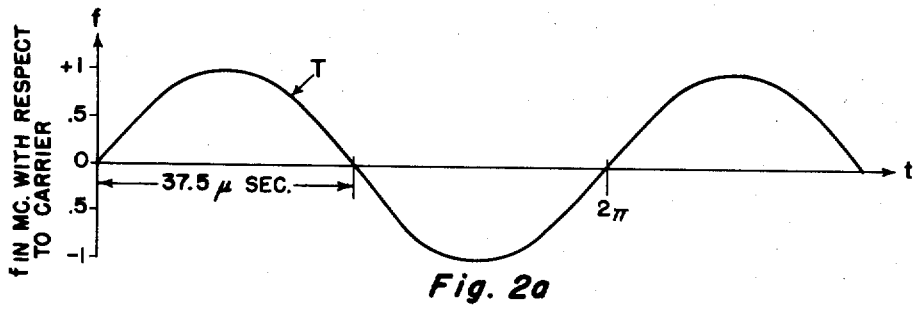
Figure 2B:
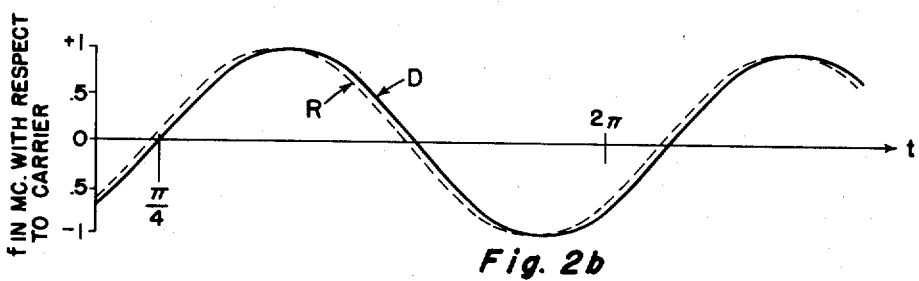
Figure 2C:
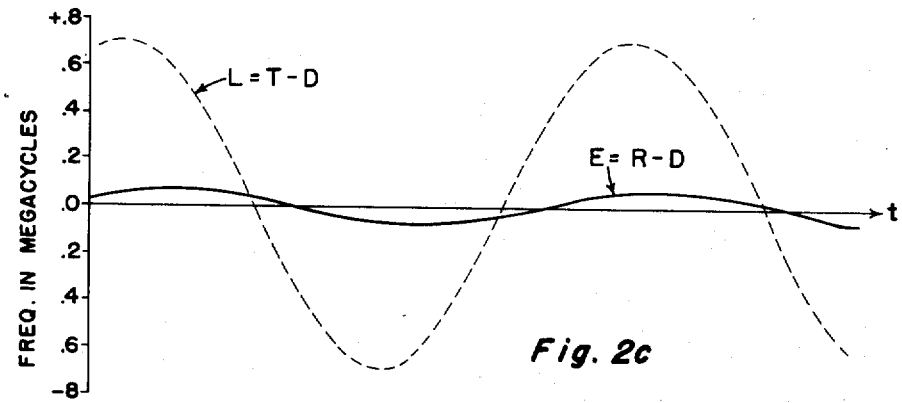
Figure 2D:
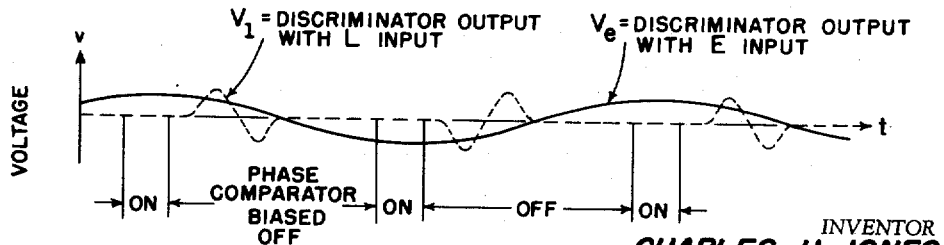
Figure 3A:
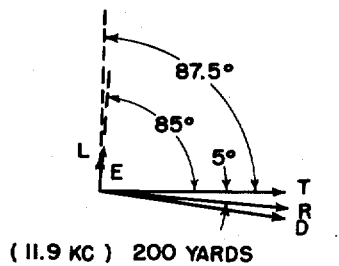
Figure 3B:
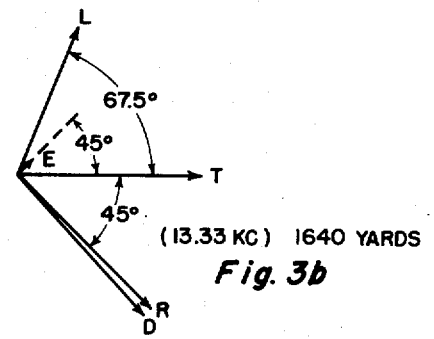
Figure 3C:
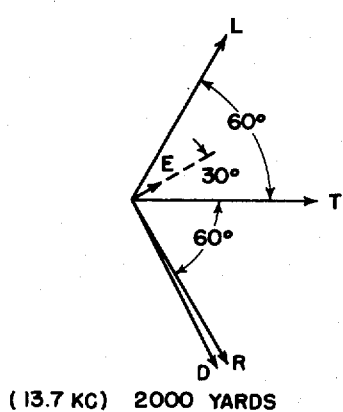
Figure 3E:
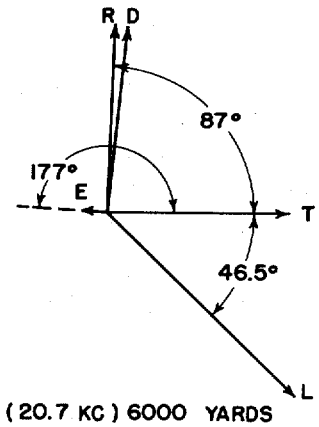
Figure 3D:
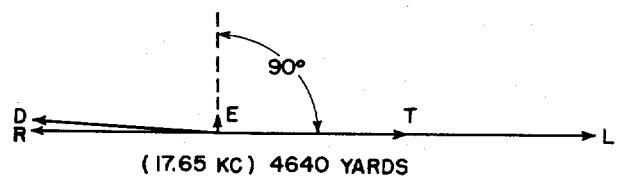
Figure 4:
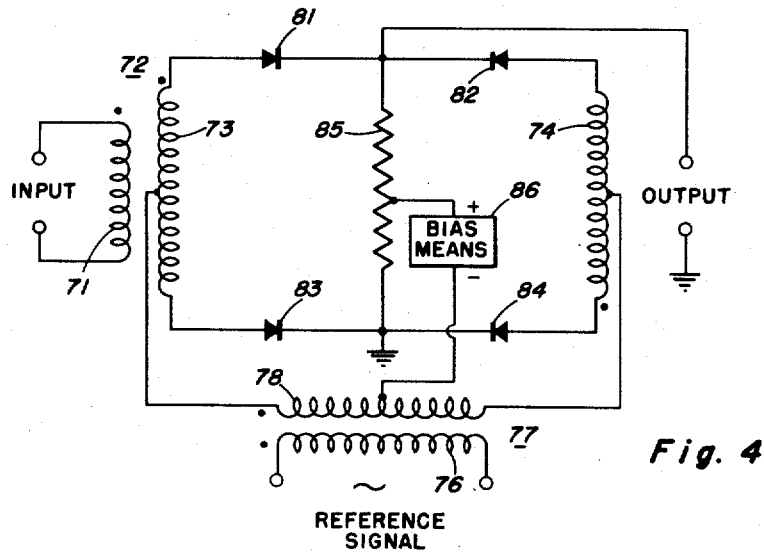
Figure 5:
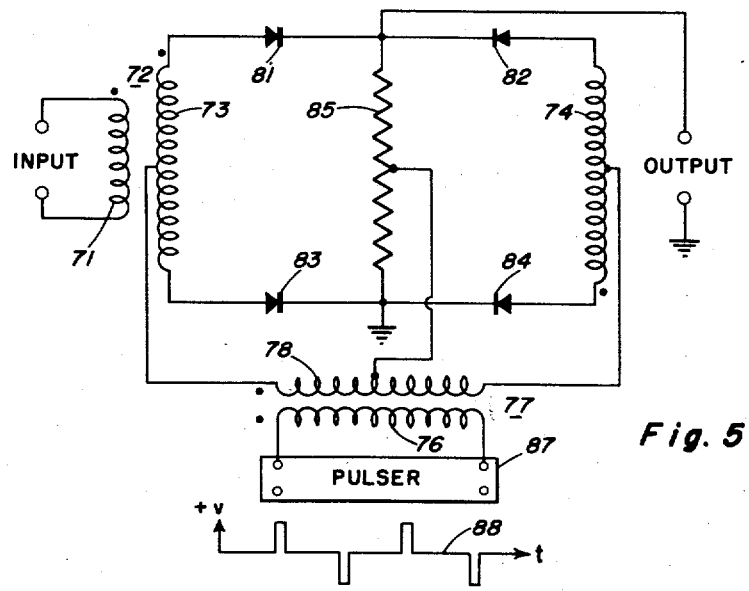

Other objects and many of the attendant advantages of this invention will be readily appreciated as the same becomes better understood by reference to the following detailed description when considered in connection with the accompanying drawings wherein:

Figs. 1a and 1b show a block diagram of a typical FM radar system in which the present invention can be utilized, Figs. 2a through 2d, inclusive, are graphs of various radar signals, Figs. 3a through 3e, inclusive, show vector diagrams giving the deviation and phase of leakthrough at typical ranges, Fig. 4 shows a schematic view of one embodiment of the invention, and Fig. 5 illustrates a schematic view of another embodiment of this invention.

Referring now to the drawings, wherein like reference characters designate like or corresponding parts throughout the several views, there is shown in Figs. 1a and 1b a block diagram of a complete FM radar system. In this block diagram, switches S1, S2 and S3 are shown in the position in which they would be during automatic tracking. A C.W. magnetron 11 operating at about 10,000 mc. is frequency modulated ±1 mc. at a rate between 10 kc. and 20 kc. by modulator 12. This signal passes to an antenna 13 by way of a directional coupler 14 and waveguide 15. The frequency modulation of the magnetron is sinusoidal, the amount of deviation is held constant, and the modulating rate is a function of the target range.

Some of the transmitted energy propagates to the target being tracked, is reflected, and is picked up by the receiving antenna 17, which is "lobed" at a 1,000 cycle rate by lobing head 18. This energy flows through a standard waveguide 21 into a balanced mixer 22 where it is converted to an I.F. frequency of $(54.5 \text{ mc.}+F_d)$. Frequency $F_d$ is the doppler frequency due to the relative motion between the radar and target. A low noise high gain "receiver-amplifier" 23 amplifies the signal from the mixer 22. The gain of this amplifier is determined by an AGC voltage.

A small portion of the transmitter signal is obtained by directional coupler 14 and is fed to a balanced mixer 24 to yield a 54.5 mc. I.F. signal. This signal is mixed with a 12.5 mc. fixed amplitude, fixed frequency derived from the crystal oscillator 26 in mixer 27 to yield a 42 mc. signal. This signal is delayed by 85 microseconds in the delay line unit 28, after which it is amplified and limited in unit 29 and combined with the received signal in transmitter-receiver mixer 31. The output from this mixer is at a frequency of $(12.5 \text{ mc.}+F_d)$.

Some energy from the 12.5 mc. crystal oscillator 26 is mixed with a $(0.5 \text{ mc.}-F_c)$ signal in unit 32 to obtain a $(12.0 \text{ mc.}+F_c)$ signal. The symbol $F_c$ denotes a correction frequency which is approximately equal to the doppler frequency at all times during tracking. The outputs of the mixers 31 and 32 are combined at doppler mixer 33 to yield a $(0.5 \text{ mc.}+F_d-F_c)$ output. This signal feeds the velocity channel, the range channel, and the position channel in parallel.

In the velocity channel, the signal first passes through an amplifier and discriminator 34 having a bandwidth about 1 kc. The output of this unit feeds the reactance tube oscillator 36 which operates on a frequency of $(0.5 \text{ mc.}-F_c)$. Action of the velocity servo loop is such as to keep $F_c$ approximately equal to $F_d$. The output frequency from unit 36 is converted in the velocity measuring circuit 37 to a D.C. voltage of $-30$ to $+30$ volts which is in proportion to relative velocities from $-400$ to $+400$ yards per second.

The signal from unit 33 also goes to the range channel where it is amplified and passed through a discriminator 38 having a bandwidth of approximately 100 kc. In this unit an AGC voltage is obtained which is fed back to unit 23. The output from discriminator 38 feeds a phase comparator circuit 41 which is also fed by an 85 microsecond delay and a 90 degree phase shift circuit 42 with a reference signal having a frequency in range from 10 kc. to 20 kc. When the two inputs to this phase comparator circuit are exactly 90 degrees out of phase there is no output. However, when the phase difference is other than 90 degrees, a positive or negative D.C. output is present and is fed through a low pass filter 43 to a reactance tube oscillator 44 which can vary from 210 kc. to 220 kc.; the exact frequency depending upon the range of the target to be tracked. The signal from reactance tube oscillator 44 is mixed with a fixed 200 kc. from an oscillator 45 in mixer 46 whose output is the difference frequency which is in the range from 10 kc. to 20 kc. This difference frequency is fed to a range measuring circuit 47 which converts the frequency to a voltage from 0–50 volts that is proportional to range of the target in the interval from 0–2,000 yards. The output frequency from unit 46 is also fed to the delay line and phase shift circuit 42. The output from unit 46 is also employed to control the rate of deviation of the transmitter modulator 12.

An output from discriminator 49 is used to generate an AFC voltage in unit 50 to maintain the local oscillator klystron 51 at a frequency of approximately 9,945.5 mc. (54.5 mc. below the center frequency of the transmitter magnetron.) The local oscillator output is split in "Magic-T" 52 and is fed to the receiver balanced mixer 22 and transmitter balanced mixer 24. The cavities 53, 54 and 55 are tuned to the local oscillator frequency and help prevent any of the transmitter energy from leaking to the receiver mixer 22 by way of the plumbing between the crystal mixers 22 and 24.

Some of the energy from the doppler mixer 33 goes to the position channel where it is first amplified in unit 56, which has a bandwidth of approximately 10 kc., and is detected in unit 57. The 1000 cycle signal from detector 57 is fed to the azimuth and elevational phase comparators 58. The lobing generator 65 generates the 4 phase 1,000 cycle signal for the lobing head 18 and phase comparator 58. The output from unit 58 is fed to azimuth and elevation receiving antenna servo units 59 which mechanically drive the receiving antenna 17 in such a direction as to keep it locked on the target being traced. A servo system 60 is used to keep the transmitting antenna 13 pointed in the same direction as the receiving antenna 17 at all times. A slight mis-alignment of the transmitting antenna 13 or some time delay in the transmitter drive servo is not serious because it simply reduces the target elimination by some small amount; the position lock of the radar is unaffected.

In searching for a target, the electronic switches S1, S2 and S3 would all be in positions opposite to that shown on the block diagram. Position information from a manually operated sighting station or from a programmed search unit 61 would be fed to unit 58. During search, unit 62 generates a saw tooth sweep voltage which is fed by way of switch S2 to the reactance tube oscillator 44 causing it to sweep over the range of frequency from 210 kc. to 220 kc. Similarly, during a search for the target in velocity, unit 63 generates a saw tooth voltage which is fed to the reactance tube oscillator 36, by way of switch S3, to vary the frequency above and below the nominal half mc. value by an amount equal to the maximum doppler shift expected.

The present invention relates to a device for performing the phase comparison functions of unit 41 of the FM radar system of Fig. 1b. It is to be realized that the present phase comparator can be used in circuits other than this FM radar system, and that the details of this one radar system are presented for illustrative purposes only. In this FM radar system, the received information is converted into such a form that a 0.5 mc. signal is fed into the range channel. Any error in range appears in the form of small deviation frequency modulation. As is shown in Fig. 1b, phase comparator 41 compares the phase of this modulation with a reference signal from unit 42. This reference signal is identical to that used to modulate magnetron 11, except for an 85 microsecond delay and a 90 degree phase shift. The positive or negative D.C. output from phase comparator 41 is used to correct the modulating frequency of modulator 12.

Receiving antenna 17 not only receives some of the transmitted signal which has been reflected from the target but also in practice it receives a small amount of the transmitted signal directly which is referred to as "leakthrough." The effect of leakthrough as a function of its amplitude and phase is shown in Figs. 2a through 2d, inclusive, for the case of a target being tracked at a 1640 yard range. In Fig. 2a, the frequency variation of the transmitted signal T is illustrated as a function of time. The two input signals to the mixer 31 are shown in Fig. 2b. When the modulation rate is made exactly correct for the rage of the target, the delayed transmitted signal D from the delay line unit 28 is in phase with the received signal R, but when the modulation rate is not correct, there is a displacement of the curves R and D as is shown in Fig. 2b. This displacement produces an error voltage E in the output of mixer 31 whose magnitude of frequency deviation is a function of the aforementioned displacement. As is illustrated in Fig. 2c, for the 1640 yard range the effective leakthrough signal L whose instantaneous frequency is equal to the instantaneous frequency of the transmitted signal minus the instantaneous frequency of the delayed transmitted signal, has a much larger frequency deviation than the error signal E. The importance of the difference in deviation between signal E and signal L is shown in Fig. 2d. The output from discriminator 38 for the error signal E is an AM wave, $V_e$, similar in shape to the frequency deviations of the signal E, but due to the relatively large frequency deviations of signal L and the narrow bandwidth of discriminator 38, the AM wave for L, $V_1$, is approximately zero over most of the period of signal L. The AM output $V_1$ is thus seen to be the familiar S-shaped curve about the time points where the frequency deviations are the smallest. Thus, if the phase comparator 41 is sensitive to the output from discriminator 38 only at the times indicated as "on" which occur near maximum amplitude points for $V_e$, then no appreciable amount of leakthrough will appear in the output of phase comparator 41 although the output of phase comparator 41 due to the error signal $V_e$ will be similar to that from a conventional phase comparator and thus proper operation of reactance tube oscillator 44 will be maintained. The actual waveshapes of the signals from discriminator 38 in Fig. 2c will be a function of the characteristics of the discriminator used and the velocity of the target. Any relative velocity other than zero will shift the leakthrough curve up or down and also, to some extent, spoil the symmetry of the error wave. However, even with no relative velocity between the set and target and with a perfect discriminator, the output from a conventional discriminator due to leakthrough will be harmful because it will give an output from the phase comparator 41.

The amount of range error caused will depend on the amplitude of leakthrough and its phase. The closer this signal is to being in phase with the true error signal and the greater its amplitude, the greater will be the damage. Unfortunately, the most damage is done at small ranges as is illustrated in Figs. 3a, 3b, and 3c. In all of the Figs. 3a through 3e, inclusive, the length of the vectors are equal to deviation, and their angular positions give the relative phase of the modulating signal. The modulation rate and range is given beneath each figure. In Fig. 3a it is seen that the leakthrough signal L is small in deviation and only 2.5 degrees out of phase with the error signal E. At 1640 yards, as is shown in Fig. 3b, the leakthrough signal deviation is considerably larger and is 22.5 degrees out of phase with the error signal E. While at 2000 yards, Fig. 3c, signal L has a still larger deviation and has a phase difference with E of 30 degrees. At the long range of 4640 yards, Fig. 3d, the deviation of the leakthrough signal is very large so that the amplitude of the signal it produces at range discriminator 38 is small. Also, the phase of the leakthrough signal out of discriminator 38 is 90 degrees out of phase with the reference signal from unit 42: thus, it produces no average output from phase comparator 41. At 6000 yards, Fig. 3e, both the deviation of signal L and its phase angle are quite large and thus little error is introduced by leakthrough. At short ranges the deviation of the leakthrough signal is small so its output from discriminator 38 is large. Also, it has a fundamental component that is almost in phase with the reference signal, hence the output from the phase comparator 41 is appreciable, and the resulting range error is serious.

The present invention comprises a phase comparator which gives no output except during the peaks of the error signal E. At ranges from 200 yards to 3,000 yards, the amplitude of the signal out of the discriminator produced by leakthrough at the peaks of E is substantially zero so that such a comparator will discriminate against leakthrough. A number of embodiments of the invention are practical, one of which is shown in Fig. 4. The signal from the radar range discriminator (discriminator 38 of the FM radar system of Fig. 1) is applied across the primary 71 of transformer 72 which has two secondaries 73 and 74 with their polarities indicated by dots. The reference signal, which in the FM radar system of Fig. 1 would come from unit 42, is conducted to the primary winding 76 of transformer 77 which has a secondary winding 78 connected between center taps of secondaries 73 and 74. The winding polarities for transformer 77 are also indicated by dots adjacent the ends of the windings. Two pairs of rectifiers 81, 82 and 83, 84 join the ends of secondaries 73 and 74; the rectifiers in each pair being connected in polarity opposition. The type of rectifier that is employed is not critical: diodes, germanium crystals, selenium rectifiers, etc. are all suitable. An impedance 85 which although shown to be a resistor could be of another type, interconnects the junctions of the two pairs of rectifiers. A bias means 86, which is poled to buck conduction of the rectifiers, is attached between a center tap on impedance 85 and a center tap on secondary 78. This bias means can be a D.C. battery, a parallel resistor-capacitor self-biasing circuit, or other means of obtaining a D.C. voltage. The output of the phase comparator is taken across impedance 85 and is utilized in the modulating-rate control and range measuring circuits (e.g. circuits 44 and 47 of Fig. 1). It is apparent that one half of the voltage appearing across secondary 73 is combined with one half of the voltage across secondary 78 and is applied across rectifiers 81 and 83. There is a 180 degree phase difference in the combination of the voltage across the upper half of secondary 73 with the voltage across the left half of secondary 78 and the combination of the voltage across the lower half of secondary 73 and the voltage across the left half of secondary 78. It is this phase difference in the combining of the two voltages that gives this circuit its phase detecting characteristic for it is seen that if the phase difference between the voltage across the upper half of secondary 73 and the left half of secondary 78 is less than 90 degrees then the phase difference between the voltage across the lower half of secondary 73 and the left half of secondary 78 must be more than 90 degrees. In this case the two voltages appearing across rectifier 81 will be more in phase and thus have a larger resultant voltage than for the two voltages appearing cross rectifier 83. Hence, rectifier 81 will conduct more current than rectifier 83 and the voltage across impedance 85 will be positive with respect to ground. The converse is true if the phase difference between the voltage across the upper half of secondary 73 and the left half of secondary 78 is more than 90 degrees. Rectifiers 82 and 84 were not considered above since their operation is the same, although displaced in time, as that for rectifiers 81 and 83, respectively. The phase difference between the voltages applied to rectifier 82 is exactly the same as the phase diference between the voltages applied to rectifier 81, but the resultants of the voltages across these rectifiers are not in phase, in fact they are 180 degrees out of phase and thus provide a full-wave action. The same is true of the voltages applied to rectifiers 83 and 84. Due to the bucking action of bias means 86, the rectifiers will not conduct until the point in each period when their resultants have a greater magnitude than the voltage across this bias means. The magnitude of the reference voltage is made much greater than the input voltage so that the resultants are either approximately in phase or 180 degrees out of phase with the reference voltage, and hence the rectifiers conduct at or near the peaks of the reference voltage, at which time the resultant voltages will have sufficient magnitude to overcome the voltage on bias means 86. As previously explained, there will be a D.C. voltage appearing at the output whose polarity and magnitude will depend upon the phase relationships between the input and reference signals. As originally explained in the discussion of Fig. 2d, it is desired to have the phase comparator operate only in the region of the peaks of the error signal E, but it is to be noted from Figs. 3a through 3d that there is approximately a 90 degree phase difference between the received signal R and the error signal E. Also, when the system is at or near "on-target" operation, the reference signal from unit 42 is approximately 90 degrees out of phase with the received signal R which will mean no output from the phase comparator. Thus, the reference signal and the error signal E are approximately in phase and if the phase comparator conducts at the peaks of the reference signal it will also be conducting at the peaks of the error signal E. Since due to the large deviation of the leakthrough signal, there will be zero leakthrough output from the range discriminator when the phase comparator rectifiers are conducting, the leakthrough does not appear in the output of this comparator.

Another suitable embodiment of this invention is illustrated in Fig. 5. No bias is provided, but peaking operation is obtained by means of pulser 87 which converts the input reference sine wave into a pulsating wave 88 having pulses at the peaks of the reference sine wave. There are many suitable circuits for performing this pulsing operation such as: thyratron circuits, multivibrators, etc. The input wave across secondaries 73 and 74 is not of sufficient magnitude to cause conduction of the rectifiers in the absence of a reference signal, thus the rectifiers will conduct only during the duration of the square waves of wave 88 which occur at the peaks of the reference voltage. The phase detecting operation is essentially the same as was explained in the discussion of the embodiment of Fig. 4.

It is thus seen that the present phase comparator has special utility in FM radar systems and gives no output except during the peaks of the error signal that is utilized to control the modulating rate of the radar magnetron. At ranges from 200 yards to 3000 yards the amplitude of the signal out of the discriminator produced by leakthrough is substantially zero at the peaks of the error signal so that such a comparator discriminates against leakthrough. At ranges near 4640 yards, a range error will result but this price is well worth paying, as the range accuracy in the 200 yard to 3000 yard region is substantially improved. Since the computers only use the radar information in the 200 to 2000 yard region, the loss in accuracy at greater ranges is not too important.

Obviously many modifications and variations of the present invention are possible in the light of the above teachings. It is therefore to be understood that within the scope of the appended claims the invention may be practiced otherwise than as specifically described.

What is claimed is:

1. A phase comparator system comprising: a first transformer having two secondaries with center taps; and a second transformer having a secondary with a center tap; two pairs of rectifiers interconnecting the ends of the secondaries of said first transformer; two junctions, one between each pair of rectifiers; impedance means with a center tap connected between said junctions; connections between the two ends of the second transformer secondary and the center taps on the secondaries of said first transformer; and bias means connected between the center taps of said impedance means and said secondary of said second transformer.

2. The system of claim 1 wherein the rectifiers of each pair have opposing polarities.

3. The system of claim 2 wherein the bias means is of a magnitude and polarity such that the rectifiers conduct only on the peak of an input voltage to the second transformer.

4. The system of claim 3 wherein the bias means is a D.C. voltage source.

(References on following page)

References Cited in the file of this patent

UNITED STATES PATENTS

| | | |
|---|---|---|
| 2,054,676 | La Pierre | Sept. 15, 1936 |
| 2,282,101 | Tunick | May 5, 1942 |
| 2,429,636 | McCoy | Oct. 28, 1947 |
| 2,666,136 | Carpenter | Jan. 12, 1954 |
| 2,713,162 | Gehman | July 12, 1955 |
| 2,759,109 | Swift | Aug. 14, 1956 |
| 2,862,182 | Posthumus | Nov. 25, 1958 |
| 2,885,631 | Scorgie | May 5, 1959 |

FOREIGN PATENTS

| | | |
|---|---|---|
| 730,790 | France | May 23, 1932 |
| 697,692 | Great Britain | Sept. 30, 1953 |